(12) United States Patent
Cho

(10) Patent No.: US 10,783,265 B2
(45) Date of Patent: Sep. 22, 2020

(54) DATA ACCESS DEVICE AND APPARATUS COMPRISING SAME

(71) Applicant: SAMSUNG ELECTRONICS CO., LTD., Suwon-si (KR)

(72) Inventor: Soon Yong Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 154 days.

(21) Appl. No.: 15/718,208

(22) Filed: Sep. 28, 2017

(65) Prior Publication Data

US 2018/0089458 A1    Mar. 29, 2018

(30) Foreign Application Priority Data

Sep. 28, 2016 (KR) .................. 10-2016-0124577
Sep. 26, 2017 (KR) .................. 10-2017-0124155

(51) Int. Cl.
*G06F 17/00* (2019.01)
*G06F 21/62* (2013.01)
*G06F 16/22* (2019.01)
*G06F 16/17* (2019.01)

(52) U.S. Cl.
CPC ...... *G06F 21/6218* (2013.01); *G06F 16/1737* (2019.01); *G06F 16/22* (2019.01)

(58) Field of Classification Search
CPC .. G06F 3/0482; G06F 16/951; G06F 16/2428; G06F 16/248; G06F 19/328; G06F 19/3418
See application file for complete search history.

(56) References Cited

U.S. PATENT DOCUMENTS

| 7,768,415 | B2 | 8/2010 | Blackadar |
| 9,063,731 | B2 | 6/2015 | Heo et al. |
| 9,086,875 | B2 | 7/2015 | Harrat et al. |
| 2008/0030711 | A1* | 2/2008 | Iizuka ............... G01S 1/70 356/4.03 |
| 2012/0197852 | A1* | 8/2012 | Dutta ............. H04L 67/2804 707/692 |
| 2012/0197911 | A1* | 8/2012 | Banka .............. H04L 67/12 707/752 |
| 2014/0287735 | A1 | 9/2014 | Kita |
| 2015/0046932 | A1 | 2/2015 | Kim et al. |
| 2015/0119726 | A1 | 4/2015 | Matsuno et al. |
| 2015/0282075 | A1 | 10/2015 | Suga |
| 2015/0347532 | A1* | 12/2015 | Shaw ............... G06F 3/0484 707/722 |
| 2015/0347791 | A1 | 12/2015 | Desai et al. |

FOREIGN PATENT DOCUMENTS

KR    10-2015-0017897 A    2/2015

* cited by examiner

*Primary Examiner* — Truong V Vo
(74) *Attorney, Agent, or Firm* — Sughrue Mion, PLLC

(57) ABSTRACT

Provided are a data access device which may retrieve at least a portion of a plurality of pieces of data from a module providing the pieces of data and an apparatus including the same. The data access device may include a data list storage configured to store a portion of a plurality of pieces of data generated by at least one sensor as an access list of data to be retrieved; and a processor configured to retrieve the portion of a plurality of pieces of data from an external source, based on the access list.

19 Claims, 5 Drawing Sheets

DATA ACCESS DEVICE AND APPARATUS COMPRISING SAME

CROSS-REFERENCE TO RELATED APPLICATION

This application claims priority from Korean Patent Applications No. 10-2016-0124577, filed on Sep. 28, 2016 and No. 10-2017-0124155, filed on Sep. 26, 2017 in the Korean Intellectual Property Office, the disclosures of which are incorporated herein by references in their entireties.

BACKGROUND

1. Field

Apparatuses consistent with example embodiments relate to a data access device and an apparatus comprising the same.

2. Description of Related Art

Portable apparatuses include various types of sensors and data access devices that access results detected by the sensors. In addition, portable apparatuses operate using limited amounts of power of batteries. Therefore, power consumed in the sensors and the data access devices is required to be minimized.

SUMMARY

Example embodiments may provide a data access device which may retrieve at least a portion of a plurality of pieces of data from a module providing the plurality of pieces of data, such as a sensor.

Example embodiments may provide an apparatus comprising a data access device which may retrieve at least a portion of a plurality of pieces of data from a module providing the plurality of pieces of data, such as a sensor.

According to an aspect of example embodiment, there is provided a data access device including: a data list storage configured to store a portion of a plurality of pieces of data generated by at least one sensor as an access list of data to be retrieved; and a processor configured to retrieve the portion of a plurality of pieces of data from an external source, based on the access list.

According to another aspect of example embodiment, there is provided an apparatus including: at least one sensor configured to generate a plurality of pieces of data, varying according to surroundings or movements of the sensor; and a data access device configured to store an access list of at least a portion of the plurality of pieces of data to be retrieved from the plurality of pieces of data, and retrieve the at least a portion of the plurality of pieces of data, based on the access list.

According to another aspect of example embodiment, there is provided a data access device including: a data list storage configured to store an access list of data to be retrieved; a state controller configured to set a state of a sensor and output information on the state of the sensor; a definer configured to define a set of pieces of required data of pieces of data generated by the sensor and store the defined set of pieces of required data in the data list storage; a data requester configured to output a request signal; and a controller configured to output a control signal for retrieving only a plurality of pieces of required data with reference to a list of the pieces of data to be retrieved that are stored in the data list storage, in response to the request signal.

BRIEF DESCRIPTION OF DRAWINGS

The above and other aspects, features, and advantages of the example embodiments will be more clearly understood from the following detailed description taken in conjunction with the accompanying drawings, in which.

DETAILED DESCRIPTION OF THE EXAMPLE EMBODIMENTS

Figure 1:
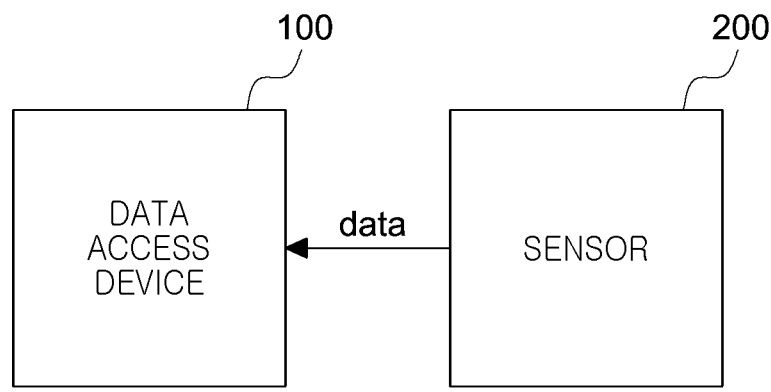
FIGS. 1 and 2 are block diagrams of apparatuses including a data access device according to an example embodiment.

Various example embodiments of the inventive concept will now be described more fully with reference to the accompanying drawings. The inventive concept may, however, be embodied in different forms and should not be construed as limited to the example embodiments set forth herein. Rather, these example embodiments are provided so that this disclosure is thorough and complete and fully conveys the inventive concept to those skilled in the art. In the drawings, the sizes and relative sizes of layers and regions may be exaggerated for clarity.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a configuration of an apparatus including a data access device according to an example embodiment. Referring to FIG. 1, an apparatus 1 according to an example embodiment may include a data access device 100 and a sensor 200.

The data access device 100 may optionally retrieve different pieces of data from the sensor 200. For example, the data access device 100 may optionally retrieve only a portion of a plurality of pieces of data generated by the sensor 200 from the sensor 200, or may retrieve all of the data from the sensor 200. To optionally retrieve the different pieces of data from the sensor 200, the data access device 100 may store a list of data to be retrieved, and may retrieve a portion or all of the pieces of data generated by the sensor 200, based on the stored list.

The data access device 100 may retrieve a portion or all of the pieces of data periodically or intermittently, and may also retrieve a portion or all of the pieces of data if an interrupt requesting data access is received from the sensor 200. In some cases, a plurality of pieces of retrieved data may be different from each other.

A plurality of pieces of data retrieved by the data access device 100 may be different from each other, depending on a state of the sensor 200 or a type of application executed on the apparatus 1. The pieces of data retrieved by the data access device 100 may also be different from each other, depending on whether the sensor 200 is calibrated.

The sensor 200 may generate a plurality of pieces of data, varying according to surroundings or movements thereof.

For example, the sensor 200 may include at least one of a heart rate monitoring (HRM) sensor and an accelerometer sensor.

The HRM sensor may detect the surroundings of the sensor 200, and generate infrared ray (IR) data, green data, and red data, varying according to the detected surroundings. When a processor of the apparatus 1, for example, an application processor (AP), determines whether the apparatus 1 is worn on a wrist of a user, the processor may use only the IR data from among the data including the IR data, the green data, and the red data. If the processor of the apparatus 1 measures a heartbeat, the processor may generally use only the green data from among the data including the IR data, the green data, and the red data. If the processor of the apparatus 1 measures oxygen saturation, the processor may use the IR data and the red data from among the data including the IR data, the green data, and the red data. If the processor of the apparatus 1 calibrates the HRM sensor, the processor may use a large number of pieces of data.

The accelerometer sensor may detect movements thereof, and generate X-axis data, Y-axis data, and Z-axis data, varying according to the detected movements. In an example embodiment, each of the X-axis data, the Y-axis data, and the Z-axis data may include upper data bits and lower data bits. If the processor of the apparatus 1 measures general acceleration, the processor may use all of the X-axis data, the Y-axis data, the Z-axis data. If the processor of the apparatus 1 detects only a relatively large motion, the processor may use only the upper data bits of the X-axis data, the Y-axis data, and the Z-axis data. If the processor of the apparatus 1 detects only a relatively small motion, the processor may use only the lower data bits of the X-axis data, the Y-axis data, and the Z-axis data.

For example, the processor of the apparatus 1 may optionally require different pieces of data. Thus, according to an example embodiment, the data access device 100 may optionally retrieve only required pieces of data, to significantly reduce communications between the data access device 100 and a module such as the sensor 200, thereby considerably lowering power consumption.

Figure 2:
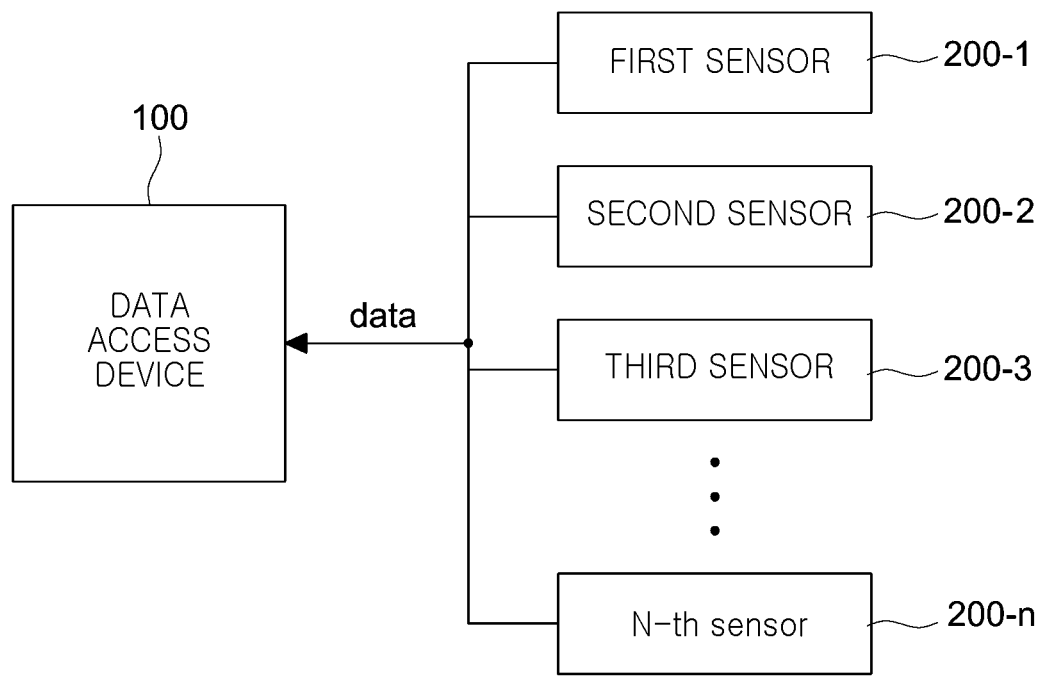

FIG. 2 is a block diagram schematically illustrating a device including a data access device according to an example embodiment. A device 1-1 according to an example embodiment may include a data access device 100 and a plurality of sensors 200-1 to 200-n.

As illustrated in FIG. 2, the apparatus 1 according to an example embodiment may include a plurality of sensors. For example, the apparatus 1 according to an example embodiment may include at least one of a gyro sensor measuring changes in angles on X, Y, and Z axes thereof by measuring angular velocity on the X, Y, and Z axes; a geomagnetic sensor detecting an azimuth using the magnetic field of the earth; an accelerometer sensor measuring acceleration on the X, Y, and Z axes; a gravity sensor detecting movements by identifying a direction in which gravity is applied; an optical sensor detecting ambient light; a proximity sensor detecting a location of an object when the object approaches the proximity sensor; a barometer recognizing an angle of slope and measuring atmospheric pressure; a motion recognition sensor recognizing movements or a location of an object; an eCompass identifying the current position by measuring an azimuth using a geomagnetic sensor; a RGB sensor measuring intensities of colors of light; a finger scan sensor recognizing information on fingerprints; a hall sensor detecting a magnetic field; a gesture sensor recognizing a hand motion of a user using infrared light; a temperature humidity sensor measuring a temperature and humidity; a heart rate sensor measuring a heart rate; a magnetometer measuring an intensity of a magnetic field; a pressure sensor measuring pressure; and an ultraviolet (UV) ray sensor measuring UV rays.

FIG. 2 illustrates the sensors 200-1 to 200-n as being individual, and the sensors 200-1 to 200-n may be implemented as a composite sensor module integrated as a single module.

The data access device 100 may perform the same function as that described above with reference to FIG. 1. For example, in some cases, the data access device 100 may only retrieve data generated by a portion of the sensors 200-1 to 200-n, or may retrieve all data generated by the sensors 200-1 to 200-n. Further, the data access device 100 may retrieve a portion or all of data generated by each of the sensors 200-1 to 200-n.

As described above with reference to FIG. 1, the data access device 100 may retrieve a portion or all of data periodically or intermittently, or when an interrupt requesting data access is received from at least one of the sensors 200-1 to 200-n. Further, data retrieved by the data access device 100 may be dependent on a state of a sensor, an application executed by the device, or whether a calibration operation of the sensor is performed.

FIGS. 1 and 2 illustrate a module providing the pieces of data as being the sensor 200, but the module may be another module, other than the sensor 200.

The apparatus 1 of FIG. 1 and the device 1-1 of FIG. 2 may be a wearable device such as a smartwatch, a mobile communications device such as a smartphone, or various other mobile devices.

Figure 3:
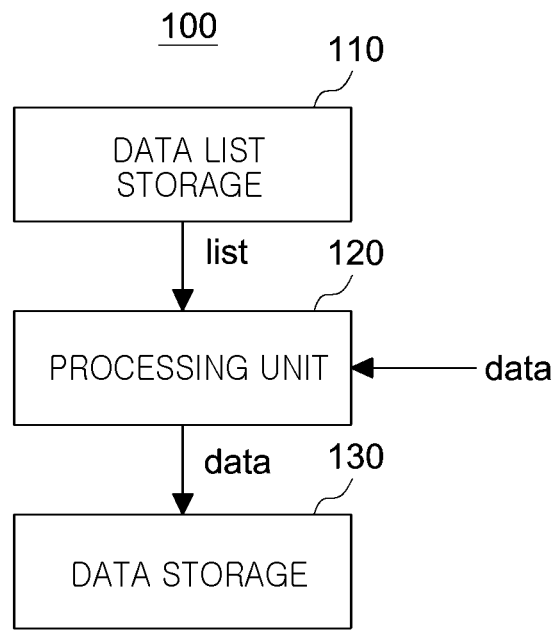
FIG. 3 is a block diagram of a data access device according to an example embodiment.

FIG. 3 is a block diagram of a data access device according to an example embodiment. A data access device 100 according to an example embodiment may include a data list storage 110, a processor 120, and a data storage 130.

The data list storage 110 may store whether any pieces of data of a plurality of pieces of data to be retrieved are required. The data list storage 110 may be a register including a plurality of bits indicating whether any pieces of data of the pieces of data to be retrieved are required. In an example embodiment, a value of each of bits corresponding to required pieces of data may be properly set according to a type of application executed on the apparatus 1, and thus whether any pieces of data of the pieces of data to be retrieved are required may be stored in the data list storage 110.

The required data may be a portion or all of a plurality of pieces of data generated by a single sensor, and may also be all of a plurality of pieces of data generated by a portion of a plurality of sensors or all of a plurality of pieces of data generated by the plurality of sensors.

For example, if an application determining whether a user wears the apparatus 1 is executed on the apparatus 1, a value of each of the bits included in the data list storage 110, corresponding to the IR data generated by the HRM sensor, may be set to 1, thereby storing information that the IR data is required. Alternatively, if an application measuring a heart rate of the user is executed on the apparatus 1, a value of each of the bits included in the data list storage 110, corresponding to the green data generated by the HRM sensor, may be set to 1, thereby storing information that the green data is required. Alternatively, if an application measuring oxygen saturation of the user is executed on the apparatus 1, a value of each of the bits included in the data list storage 110, corresponding to the IR data and the red data generated by the HRM sensor, may be set to 1, thereby storing information that the IR data and the red data are required. In the same manner, according to required data of the X-axis data, the Y-axis data, and the Z-axis data generated by the accelerometer sensor, a value of each of the bits of the X-axis data, the Y-axis data, and the Z-axis data, corresponding to the upper data bits or the lower data bits, may be properly set, thereby storing information that any pieces of data are required.

The value of each of the bits included in the data list storage 110 may be set according to whether any application is executed. Such an operation may be performed by an executed application, and may also be conducted by another program or by hardware that monitors operations of an application.

The processor 120 may retrieve a plurality of pieces of data with reference to the data list storage 110, and store the retrieved pieces of data in the data storage 130. For example, if a value of each bits of the bits included in the data list storage 110, corresponding to the IR data generated by the HRM sensor, is set to 1, and a value of each bits of the bits included in the data list storage 110, corresponding to the green data and the red data generated by the HRM sensor, is set to 0, the processor 120 may retrieve only the IR data, except for the green data and the red data.

The processor 120 may include a processor such as a micro controller unit (MCU), an interface circuit, or the like. The processor 120 may also include a plurality of processors. For example, the processor 120 may include a processor storing a list of a plurality of pieces of data to be retrieved in the data list storage 110, a processor retrieving the pieces of data from the sensor 200 of FIG. 1, with reference to the data list storage 110.

The processor 120 may retrieve at least one of the plurality of pieces of data generated by the sensor 200 by retrieving a specific address value. In an example embodiment, the processor 120 may read a list of a plurality of pieces of required data stored in the data list storage 110, and determine whether to retrieve any address value, based on the list of the pieces of required data.

The data storage 130 may store the pieces of data retrieved by the processor 120. The data storage 130 may be a register or other memory device.

Figure 4:
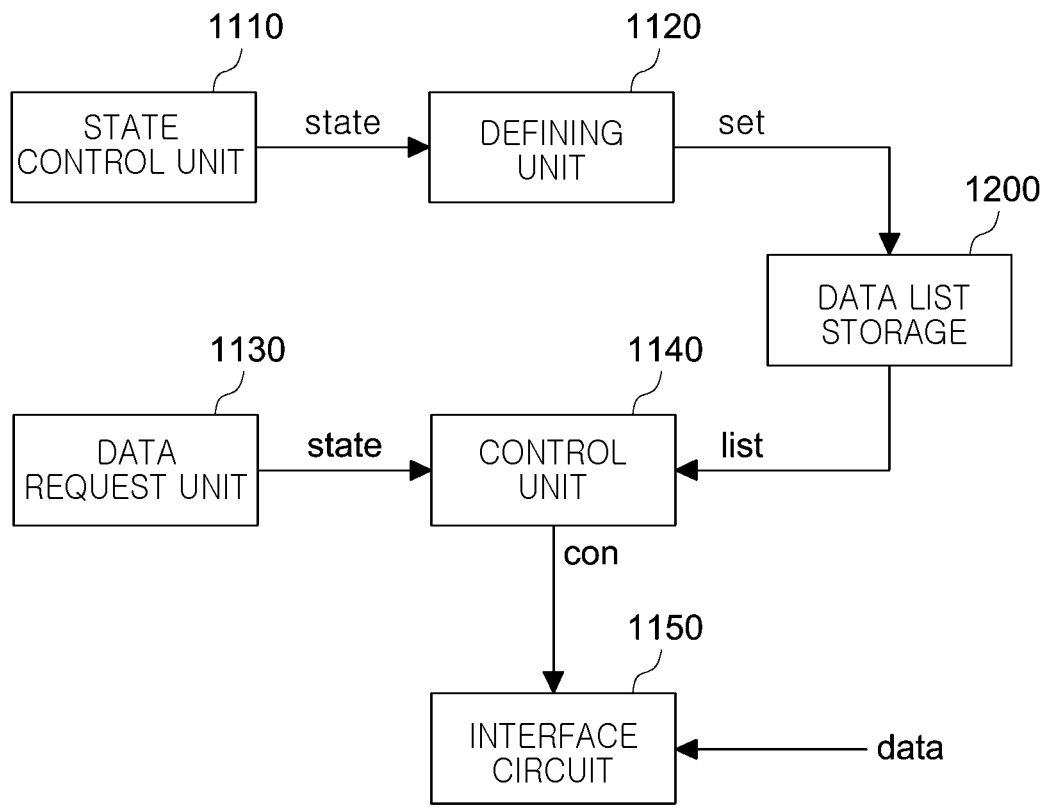
FIG. 4 is a block diagram illustrating a configuration of a data access device according to an example embodiment.

FIG. 4 is a block diagram of the configuration of a data access device according to an example embodiment. The data access device according to an example embodiment may include a state controller 1110, a definer 1120, a data requester 1130, a controller 1140, an interface circuit 1150, and a data list storage 1200.

The state controller 1110 may set a state of at least one sensor 200 of FIG. 1 or at least one sensor of sensors 200-1 to 200-n of FIG. 2 to control the at least one sensor 200 of FIG. 1 or the at least one sensor of sensors 200-1 to 200-n of FIG. 2, and output information on the state of the at least one sensor 200 of FIG. 1 or the at least one sensor of sensors 200-1 to 200-n of FIG. 2. For example, the state controller 1110 may control the at least one sensor 200 of FIG. 1 or the at least one sensor of sensors 200-1 to 200-n of FIG. 2 so that the at least one sensor 200 of FIG. 1 or the at least one sensor of sensors 200-1 to 200-n of FIG. 2 may generate a plurality of pieces of required data, according to an application executed on the apparatus 1 of FIG. 1. In addition, the state controller 1110 may output the information on the state of the at least one sensor 200 of FIG. 1 or the at least one sensor of sensors 200-1 to 200-n of FIG. 2, for example, information on whether the at least one sensor 200 of FIG. 1 or the at least one sensor of sensors 200-1 to 200-n of FIG. 2 performs any operations.

The definer 1120 may define a set of pieces of required data of the pieces of data generated by the at least one sensor 200 of FIG. 1 or the at least one sensor of sensors 200-1 to 200-n of FIG. 2. For example, the definer 1120 may receive the information on the state of the at least one sensor 200 of FIG. 1 or the at least one sensor of sensors 200-1 to 200-n of FIG. 2, and define a set of pieces of data required for the data list storage 1200, according to the state of the at least one sensor 200 of FIG. 1 or the at least one sensor of sensors 200-1 to 200-n of FIG. 2 set by the state controller 1110. In addition, the definer 1120 may determine whether the at least one sensor 200 of FIG. 1 or the at least one sensor of sensors 200-1 to 200-n of FIG. 2 operates to perform any functions based on the information on the state of the at least one sensor 200 of FIG. 1 or the at least one sensor of sensors 200-1 to 200-n of FIG. 2, define a set of pieces of required data, according to a determination result, and store the defined set of pieces of required data in the data list storage 1200. Further, the definer 1120 may define a plurality of pieces of data required to calibrate the at least one sensor 200 of FIG. 1 or the at least one sensor of sensors 200-1 to 200-n of FIG. 2 when the at least one sensor 200 of FIG. 1 or the at least one sensor of sensors 200-1 to 200-n of FIG. 2 is calibrated, and store the defined pieces of data in the data list storage 1200.

The data requester 1130 may output, to the controller 1140, a request signal (req) allowing a plurality of pieces of data generated by the at least one sensor 200 of FIG. 1 or the at least one sensor of sensors 200-1 to 200-n of FIG. 2 to be retrieved therefrom. The data requester 1130 may output the request signal (req) to the controller 1140 periodically or intermittently, and may also output the request signal (req) to the controller 1140 if an interrupt is received from the at least one sensor 200 of FIG. 1 or the at least one sensor of sensors 200-1 to 200-n of FIG. 2.

The controller 1140 may output a control signal (con) for retrieving only a plurality of pieces of required data with reference to a list of the pieces of data to be retrieved that are stored in the data list storage 1200, in response to the request signal (req) received from the data requester 1130.

The interface circuit 1150 may retrieve the pieces of required data from the at least one sensor 200 of FIG. 1 or the at least one sensor of sensors 200-1 to 200-n of FIG. 2, in response to the control signal (con). The interface circuit 1150 may store the retrieved pieces of required data in the data storage 130 of FIG. 3.

The data list storage 1200 may be the same as the data list storage 110 illustrated in FIG. 3.

Each of the state controller 1110, the definer 1120, the data requester 1130, and the controller 1140 may be a software module controlled by a processor such as an MCU, and may also be an individual processor. The state controller 1110, the definer 1120, the data requester 1130, the controller 1140, and the interface circuit 1150 may configure the processor 120 of FIG. 3.

For example, according to an example embodiment, only a plurality of pieces of data included in a list stored in the data list storage 1200 may be transmitted from the sensor 200 to the data access device, according to a state of the sensor 200 or operations performed by the apparatus 1. Thus, removal of unnecessary communications may allow a period of time in which the processor of the data access device, for example, an MCU, maintains an active mode to be reduced, and may allow a period of time in which the processor remains in low power mode to be increased, thereby reducing power consumption of the data access device.

Figure 5:
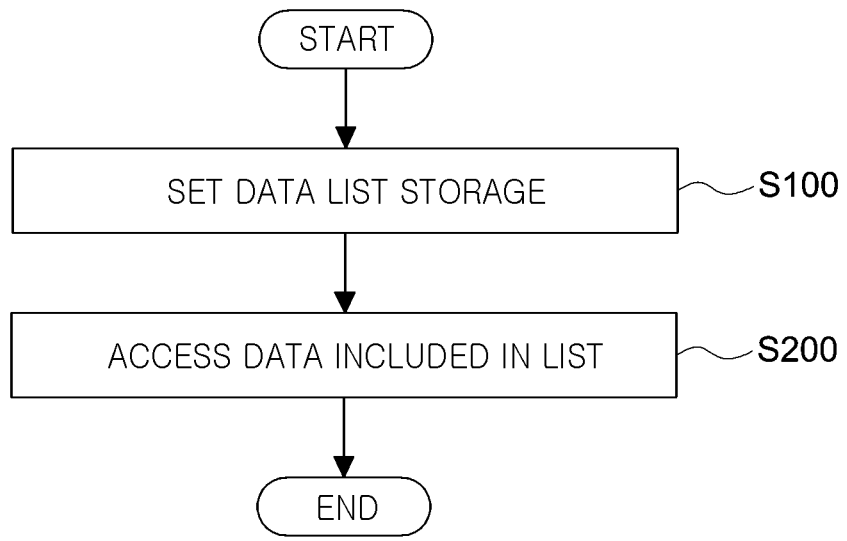
FIGS. 5 through 9 are flowcharts illustrating operations of a data access device according to an example embodiment.

FIG. 5 is a flowchart illustrating operations of a data access device according to an example embodiment.

Referring to FIG. 4, the data access device may store a list of a plurality of pieces of data to be retrieved in a data list storage (operation S100). The data access device may store the list of the pieces of data to be retrieved in the data list storage, according to a state of at least one sensor, an application executed on an apparatus, or operations performed by the apparatus.

Subsequently, the data access device may retrieve only the pieces of data included in the list stored in the data list storage from a module or modules, such as the sensor (operation S200). The data access device may retrieve the pieces of data periodically or intermittently, and may retrieve the pieces of data when being requested by the module or modules to retrieve the pieces of data.

Figure 6:
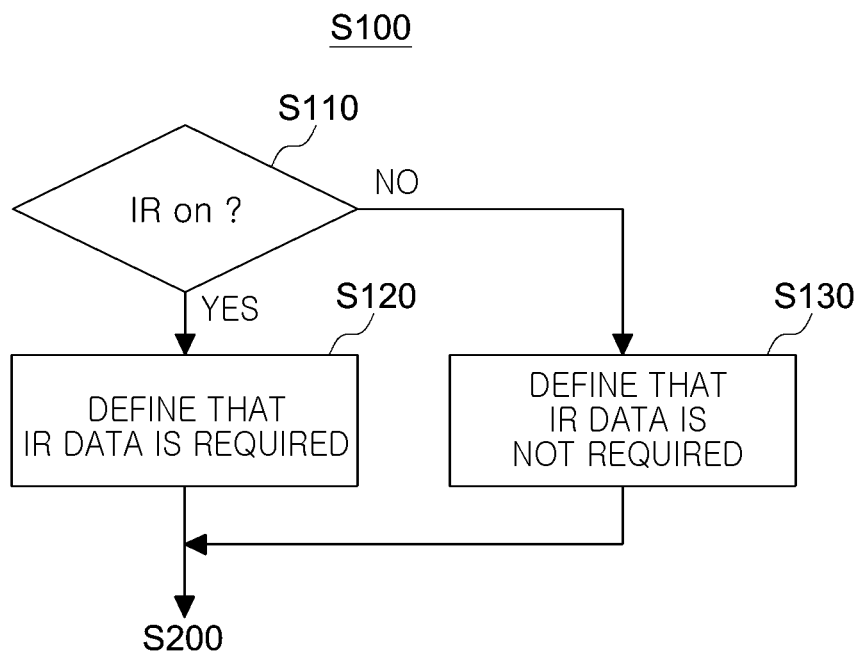

FIG. 6 is a flowchart illustrating operations of a data access device when the data access device sets whether IR data generated by an HRM sensor is required, and illustrates operations of a data access device according to an example embodiment.

As described above, according to an example embodiment, a list to be stored in a data list storage may be determined by the state of a sensor.

In detail, if it is required to use IR data (for example, when determining whether a user wears an apparatus including the data access device, or when measuring oxygen saturation), the state controller 1110 of FIG. 3 may control the sensor to generate IR data.

According to an example embodiment, the data access device may determine whether the sensor generates effective IR data (operation S110).

If it is determined that the sensor generates effective IR data, the data access device may store, in the data list storage, information that the effective IR data is required (operation S120).

If it is determined that the sensor does not generate effective IR data, the data access device may store, in the data list storage, information that the effective IR data is not required (operation S130).

Operations S120 and S130 may also be performed by setting an appropriate value of a corresponding bit included in the data list storage.

FIG. 6 illustrates an operation of setting a list of a plurality of pieces of required data according to a state of the sensor, but an operation of setting a list of a plurality of pieces of required data according to a type of application or a function executed on the apparatus may also be performed in a manner similar to that illustrated in FIG. 6. For example, determining whether an application requiring IR data has been executed may determine whether the IR data is required.

Figure 7:
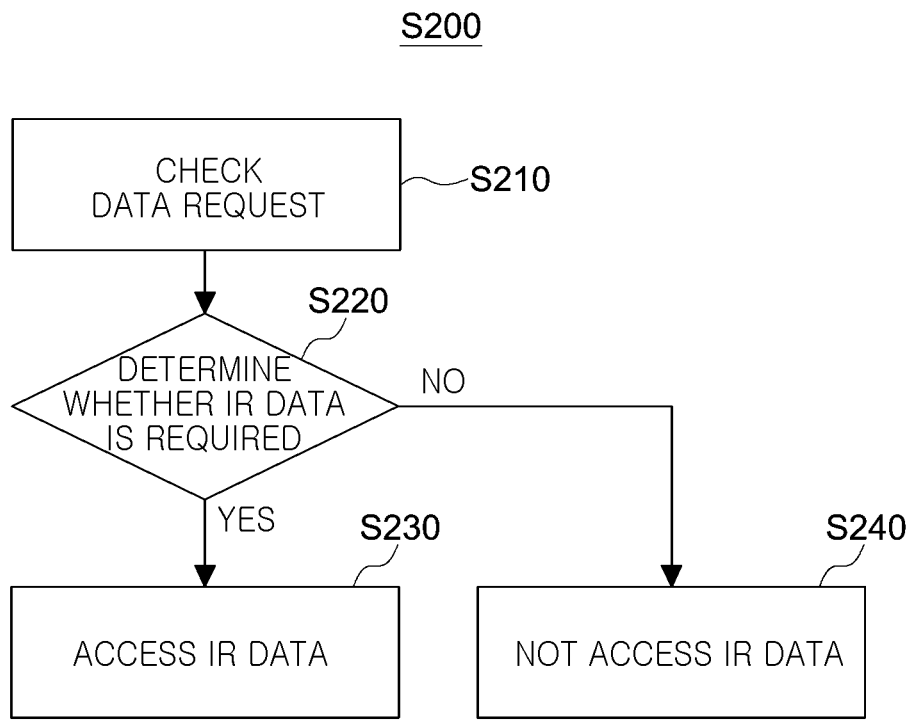

FIG. 7 is a flowchart illustrating operations of a data access device when the data access device retrieves IR data generated by an HRM sensor, and illustrates operations of the data access device according to an example embodiment.

The data access device may determine whether a plurality of pieces of IR data has been requested (operation S210). For example, the data access device may determine whether a period of time when a plurality of pieces of IR data are required has been arrived, or whether a request for a plurality of pieces of IR data has been received from an external source.

If it is determined that the pieces of IR data have been requested, the data access device may determine whether the pieces of IR data are required, based on a list of a plurality of pieces of IR data to be retrieved that are stored in a data list storage (operation S220). For example, the data access device may read a value of a specific bit included in the data list storage, and determine whether a piece of IR data is required.

If it is determined that the pieces of IR data are required, the data access device may retrieve the pieces of IR data from the sensor (operation S230).

If it is determined that the pieces of IR data are not required, the data access device may not retrieve the pieces of IR data from the sensor (operation S240).

Operations S230 and S240 may be performed by allowing the data access device to read or not read a specific address value.

FIGS. 6 and 7 illustrate the pieces of IR data generated by the HRM sensor as examples, but the decision as to whether to gain an access to pieces of data other than the IR data may be determined in a manner similar to those decisions illustrated in FIGS. 6 and 7.

Figure 8:
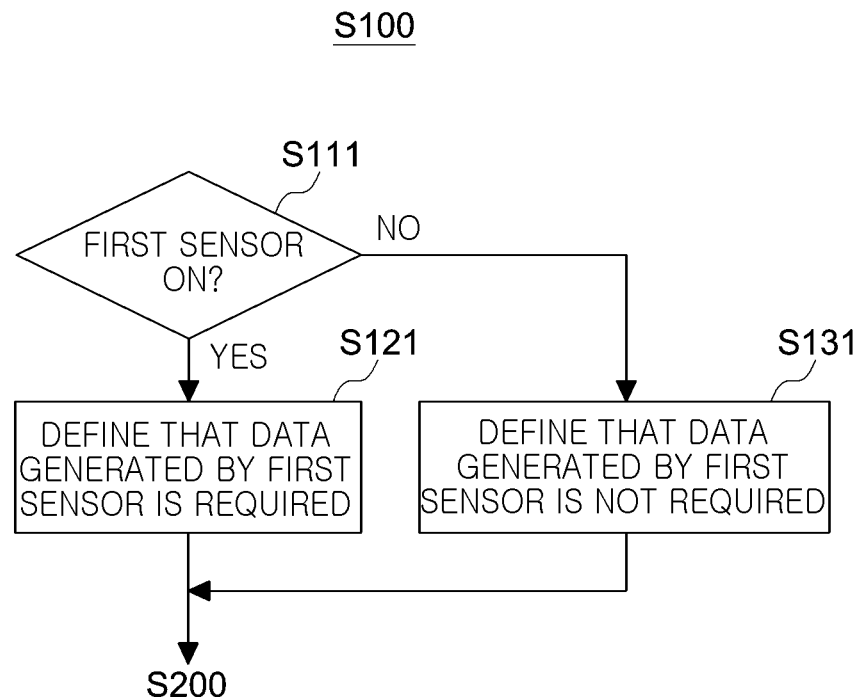

FIG. 8 is a flow chart illustrating operations of a data access device, according to an example embodiment, illustrating operations of determining whether data generated by a first sensor (for example, the sensor 200-1 of FIG. 2) of a plurality of sensors is required.

According to an example embodiment, the data access device may determine first whether the data generated by the first sensor is valid (operation S111). The data access device may determine whether the first sensor is activated to generate data, or may determine whether data generated by the first sensor is valid according to a type of application, or a function, executed by a device.

When it is determined in operation S111 that the data generated by the first sensor is valid, the data access device may store, in a data list storage, information that the data generated by the first sensor is required (operation S121).

When it is determined in operation S111 that the data generated by the first sensor is invalid, the data access device may store, in a data list storage, information that the data generated by the first sensor is not required (operation S131).

Operations S121 and S131 may also be performed by properly setting a value of a corresponding bit included in the data list storage.

Subsequent to operation S111, an operation similar to each operation in FIG. 6 may also be performed to set only a portion of a plurality of pieces of data generated by the first sensor as required data. For example, when the first sensor is an HRM sensor, the same operation as described above with reference to FIG. 6 may be performed subsequently to operation S111.

Figure 9:
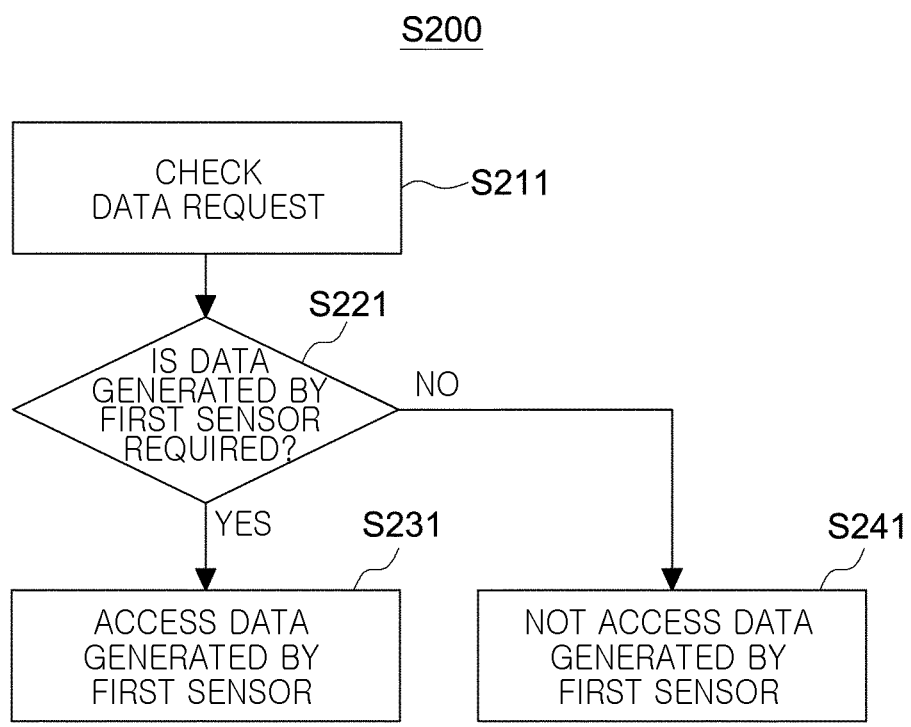

FIG. 9 is a flow chart illustrating operations of a data access device, according to an example embodiment, illustrating operations of retrieving data generated by the first sensor (for example, the sensor 200-1 of FIG. 2).

First, the data access device may determine whether data is requested (operation S211). For example, the data access device may determine whether a period of time when data is required has been arrived, or may determine whether a request for data has been received from an external source.

Subsequently, if it is determined that the data have been requested, the data access device may determine whether the data generated by the first sensor is required, based on a list of a plurality of pieces of data to be retrieved that are stored in the data list storage (operation S221). For example, the data access device may read a value of a specific bit included in the data list storage, and may determine whether the data generated by the first sensor is required.

If it is determined that the data generated by the first sensor is required, the data access device may retrieve all data generated by the first sensor from the first sensor (operation S231).

If it is determined that the data generated by the first sensor is not required, the data access device may not retrieve the data generated by the first sensor (operation S241).

Operations S231 and S241 may be performed by allowing the data access device to read or not read a specific address value.

Subsequent to operation 221, operations similar to operations 220, 230 and 240 in FIG. 7 may be performed to allow the data access device to retrieve only a portion of the pieces of data generated by the first sensor. For example, when the first sensor is an HRM sensor, the same operations as operations 220, 230 and 240 in FIG. 7 may be performed to allow the data access device to retrieve or not retrieve IR data.

Each operation illustrated in FIGS. 8 and 9 may also be performed with respect to each of the sensors. Thus, the data access device may retrieve only data generated by a portion of the sensors, and in some cases, may also retrieve a portion of each of a plurality of pieces of data generated by a portion or all of the sensors.

As set forth above, according to example embodiments, a data access device and an apparatus comprising the same may significantly reduce an amount of power consumed in retrieving a plurality of pieces of data from a module providing the pieces of data, such as a sensor.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIG. 3 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors.

Furthermore, the components, elements, modules or units represented by a block or processing steps may employ any number of related art techniques for electronics configuration, signal processing and/or control, data processing and the like.

While example embodiments have been shown and described above, it will be apparent to those skilled in the art that modifications and variations could be made without departing from the scope of the inventive concept as defined by the appended claims.

What is claimed is:

1. A data access device comprising:
   a data list storage configured to store an access list of a portion of a plurality of pieces of data to be retrieved, from among the plurality of pieces of data generated by at least one sensor; and
   a processor configured to retrieve the portion of the plurality of pieces of data generated by the at least one sensor from an external source, based on the access list,
   wherein the data list storage, the processor, and the at least one sensor are included within a same device, and
   wherein the access list is determined by a state of the at least one sensor to reduce power consumption of the data access device.

2. The data access device of claim 1, wherein the data list storage is configured to store the access list of the portion determined, from among the plurality of pieces of data, based on a type of executed application.

3. The data access device of claim 1, wherein the data list storage is configured to store a plurality of bits corresponding to the plurality of pieces of data, respectively.

4. The data access device of claim 3, wherein the processor is configured to comprise:
   a state controller configured to control a sensor, and output information on a state of the sensor; and
   a definer configured to set a value of each of the plurality of bits based on the information on the state of the sensor.

5. The data access device of claim 3, wherein the processor is configured to receive information on an executed application and set the value of each of the plurality of bits, according to the information on the executed application.

6. The data access device of claim 1, wherein the processor is configured to retrieve a portion of the plurality of pieces of data generated by the at least one sensor.

7. The data access device of claim 1, wherein the processor is configured to retrieve a plurality of pieces of data generated by a portion of the at least one sensor.

8. An apparatus comprising:
   at least one sensor configured to generate a plurality of pieces of data, varying according to surroundings or movements of the at least one sensor; and a data access device configured to store an access list of a portion of the plurality of pieces of data to be retrieved among the plurality of pieces of data, and retrieve the portion of the plurality of pieces of data, based on the access list, wherein the at least one sensor and the data access device are included within a same device, and wherein the access list is determined by a state of the at least one sensor to reduce power consumption of the data access device.

9. The apparatus of claim 8, wherein the data access device is configured to store the access list of the portion determined, from among the plurality of pieces of data, based on a state of the at least one sensor or an executed application.

10. The apparatus of claim 8, wherein the data access device is configured to comprise:
a data list storage configured to store a plurality of bits corresponding to the plurality of pieces of data, respectively; and
a processor configured to retrieve the portion of the plurality of pieces of data, based on values of the plurality of bits.

11. The apparatus of claim 10, wherein the processor is configured to set a value of each of the plurality of bits, according to the state of the sensor.

12. The apparatus of claim 10, wherein the processor is configured to set a value of each of the plurality of bits, according to an executed application.

13. The apparatus of claim 8, wherein the data access device is configured to retrieve the portion of the plurality of pieces of data generated by the at least one sensor, from the at least one sensor.

14. The apparatus of claim 8, wherein the data access device is configured to retrieve the portion of the plurality of pieces of data generated by a portion of the at least one sensor.

15. A data access device comprising:
a data list storage configured to store an access list of data to be retrieved;
a state controller configured to set a state of a sensor and output information on the state of the sensor;
a definer configured to define required data of a plurality of pieces of data generated by the sensor and store the required data in the data list storage;
a data requester configured to output a request signal; and
a controller configured to output a control signal for retrieving only a portion of the required data with reference to the access list of the data to be retrieved that are stored in the data list storage, in response to the request signal,
wherein the access list is determined by a state of the sensor to reduce power consumption of the data access device.

16. The data access device of claim 15, further comprising an interface circuit configured to retrieve the required data from the sensor in response to the control signal.

17. The data access device of claim 16, further comprising a data storage configured to store the required data retrieved from the sensor.

18. The data access device of claim 15, wherein the data requester is configured to output the request signal to the controller periodically.

19. The data access device of claim 15, wherein the data list storage is configured to store the access list of data determined based on the state of the sensor or an executed application.

* * * * *